United States Patent [19]

Laborit

[11] 3,925,153
[45] Dec. 9, 1975

[54] COMPOSITION FOR CONSERVATION OF BLOOD

[75] Inventor: Henri Laborit, Paris, France

[73] Assignee: Centre d'Etudes Experimentales et Cliniques de physio Biologie de Pharmacologie et d'Eutonologie, Paris, France

[22] Filed: Jan. 8, 1973

[21] Appl. No.: 321,642

Related U.S. Application Data

[63] Continuation-in-part of Ser. Nos. 143,568, May 14, 1971, abandoned, and Ser. No. 19,532, March 18, 1970, abandoned, and Ser. No. 670,186, Sept. 25, 1967, abandoned.

[52] U.S. Cl................................. 195/1.8; 195/1.8
[51] Int. Cl.² ...................................... A61K 35/14
[58] Field of Search...................... 195/1.8; 424/331

[56] References Cited
UNITED STATES PATENTS 3,795,581   3/1974   Deindoerfer et al................ 195/1.8

OTHER PUBLICATIONS

Laborit et al., Agressologie, Vol. 7, No. 4, pp. 315-327, 1966.

Laborit et al., Agressologie, Vol. 7, No. 6, pp. 581-594, 1966.

Chemical Abstracts, Vol. 66, entry 20701e, 1966.

Chemical Abstracts, Vol. 72, entry 10708n, 1970.

*Primary Examiner*—Shep K. Rose

[57] ABSTRACT

A composition for the conservation of blood which comprises a mixture of dihydroxyacetone or a blend of dihydroxyacetone and nicotinamide and other well known blood stabilizer materials of the art. The dihydroxyacetone replaces glucose in these new formulations and is admixed with for example, citric acid and sodium hydroxide in an ACD solution or sodium citrate and monosodium phosphate for preparation of a CPD solution. The use of dihydroxyacetone in place of glucose gives a unique and unexpected cellullar metabolism which converts dihydroxyacetone into dihydroxyacetone phosphate, hence intracellularly into glycerophosphate and finally into glyceraldehyde-3-phosphate.

3 Claims, No Drawings

COMPOSITION FOR CONSERVATION OF BLOOD

This application is a continuation-in-part application of application Ser. No. 143,568 filed May 14, 1971, now abandoned and Ser. No. 19,532 filed Mar. 18 1970 (now abandoned), and Ser. No. 670,186 filed Sept. 25,1967(now abandoned).

BACKGROUND OF THE INVENTION

Media generally used for the conversation and extending of blood are made up of a citrate solution and glucose. Various formulae are presently used which vary from one where the citrate solution is citric acid plus sodium hydroxide to form a so called "ACD" solution to one where sodium citrate and monosodium phosphate form a so called "CPD" solution. However the presently used compositions have a drawback in that the cellular metabolism is very slow. Hence it would be of distinct advantage to users to have available a blood stabilizer which increases cellular metabolism and introduces a new supply of glyceraldehyde phosphate into the cycle and thereby increases glycolysis.

The primary object of the present invention therefore is to describe and disclose a composition of matter useful in the conservation of blood which is much improved over those presently in use. A further object of the invention is to disclose a new method for the conservation of blood which involves the use of these compositions. The discovery which led to the present invention arose as a consequence of a basic study of the effects of the chemical dihydroxyacetone on the blood of mammals including man as more generally and particularly set out in my copending patent application noted above.

BRIEF DESCRIPTION OF THE INVENTION

Accordingly it has been discovered that dihydroxyacetone alone or combined with from 10 to 90 per cent of the composition nicotinamide constitutes a far better and superior substrate for the conservation of whole blood than glucose which is presently employed by those skilled in the art in the formulation of most ACD and CPD solutions. The present invention in its product or composition of matter aspects comprises therefore a blood conservation medium in which dihydroxyacetone or dihydroxyacetone mixed with nicotinamide replaces glucose in the formulation of ACD or CPD solutions for hospital or other medical uses.

The improved performance of the dihydroxyacetone blend of the same with nicotinamide can be explained by the fact that the dihydroxyacetone constitutes an unexpectedly excellent substrate for cellular metabolism (Henri Laborit, B. Weber et al reported this fact in published literature. Furthermore Tsao et al reported and demonstrated that dihydroxyacetone is rapidly phosphorylated in the body into dihydroxyacetone phosphate. This latter compound is in equilibrium with phosphate glyceraldehyde and can provide glycolysis through this pathway. Above all it can be reduced into glycerophosphate at the expense of the hydrogen of extra mitochondrial NADH (which is the commonly employed abbreviation for nicotinamide-adenine dinucleotide in its reduced form).

It is a known fact that the ratios of nicotinamide-adenine dinucleotide (NAD) to $NADH_2$, its reduced form, and the ratios of adenosine triphosphate(ATP) to adenosine diphosphate (ADP) regulate glycolysis activity which increases as these ratios decrease. Between glyceraldehyde and pyruvate there is formed in derivation 2,3 diphosphoglycerate (2,3 DPG)

The administration of dihydroxyacetone to red blood cells increases glycolysis in that part of the pathway involved with 2,3 diphosphoglycerate formation and as a result an increased formation of this intermediary is found. It is known that 2,3 diphosphoglycerate competes with oxygen on hemoglobin thus favoring the breakdown of oxyhemoglobin.

The advantage of associating nicotinamide with dihydroxyacetone can be explained by the fact that it is nicotinamide which is used for the intercellular formation of NAD and administration of this substance (NAD) generally produces an increase in cellular concentration of co-enzyme which plays an important part in the process of glycolysis. The blend of the two may vary widely in ratios but generally substantially equal amounts have been found useful as shown in the following examples. There is no reason to believe that amounts of 1 part of nicotinamide combined with 9 parts of dihydroxyacetone would not function equally as well as the reverse of this ratio.

The following examples illustrate the invention in its product and method aspects. These experiments described below compare the test results obtained from four different solutions. The first two solutions ACD and CPD represent those presently used for blood conservation. The third is a solution as claimed in this patent application and represents the C.P.-DHA combination. The last solution illustrated by Example 4 represents the C.P.-DHA-nicotinamide composition which is also part of this invention.

| Preparations Example 1 (comparative) | |
|---|---|
| ACD Solution Ingredient | Amount |
| citric acid monohydrate | 0.85 grams |
| anhydrous glucose | 1.00 grams |
| sodium hydroxide | 0.30 grams |
| water qs | 50 cc |

| Example 2 (comparative) | |
|---|---|
| Ingredient | Amount |
| anhydrous glucose | 2.32 grams |
| sodium citrate dihydrate | 2.68 grams |
| citric acid monohydrate | 327 milligrams |
| phosphate monosodium monohydrate | 222 milligrams |
| water q.s. a. d. | 100 ml. |

| Example 3 | |
|---|---|
| Ingredient | Amount |
| dihydroxyacetone | 2.32 grams |
| sodium citrate dihydrate | 2.63 grams |
| citric acid monohydrate | 327 milligrams |
| phosphate monosodium monohydrate | 222 milligrams |
| water q.s i.d. | 100 ml |

| Example 4 | |
|---|---|
| Ingredient | Amount |
| dihydroxyacetone | 2.32 grams |
| nicotinamide 0.04 M | 2.44 grams |
| sodium citrate dihydrate | 2.65 grams |

-continued

Example 4

| Ingredient | Amount |
|---|---|
| citric acid monohydrate | 327 milligrams |
| phosphate monosodium monohydrate | 222 milligrams |
| water | 100 ml |

Test Procedure

Rabbit blood was collected under vacuum in flasks containing the four solutions described above which were maintained at a temperature of 4 C. Samples were taken of each lot of blood during the course of the experiment at the end of 1, 3, 7, 9, 11, 14, and 19 days to determine the pH of the blood, $PO_2$ content and concentration of 2,3 diphosphoglycerate and ATP in each sample of blood. The content of phosphoglycerate was measured by colorimitry while theATP concentration was measured by the enzyme methof of Boehringer. The findings and test results are set out in the following tables I, II and III

TABLE I

| | VARIATIONS IN BLOOD PH | | | |
|---|---|---|---|---|
| Number of days | ACD Ex 1 | CPD Ex 2 | CP-DHA Ex 3 | CP-DHA-NICOTINAMIDE Ex 4 |
| 1st | 6.80 | 7.35 | 7.15 | 7.19 |
| 3rd | 6.8 | 6.99 | 7.01 | 7.04 |
| 7th | 6.80 | 6.80 | 6.83 | 6.89 |
| 9th | 6.80 | 6.80 | 6.80 | 6.82 |
| 11th | 6.80 | 6.80 | 6.80 | 6.80 |
| 14th | 6.80 | 6.80 | 6.80 | 6.80 |
| 19th | 6.80 | 6.80 | 6.80 | 6.80 |

Table I shows that decrease in pH values is much slower in the medium which also contains the dihydroxyacetone. This effect is particularly noted in the solution in which dihydroxyacetone. For instance with prior art compositions (Examples 1 and 2) the pH drops below 6.8 on the 3rd day of blood conservation, in the first instance and in the latter case the pH drops below par on the 7th day. However with the composition of the invention as noted in Example 3 the pH does not dip below par until the 9th day of the test. Even more striking is the fact that with a combination of the dihydroxyacetone and the nicotinamide the ph value does not dip until the 11th day of the study. This is unexpected and significant.

TABLE II

| | VARIATIONS OF THE PHOSPHATE CONTENT | | | |
|---|---|---|---|---|
| Number of days | ACD Ex 1 | CPD Ex 2 | CP-DHA Ex 3 | CP-DHA-NICOTINAMIDE Ex 4 |
| 1st | 110 | 117 | 114 | 141 |
| 3rd | 158 | 165 | 182 | 176 |
| 7th | 141 | 151 | 176 | 211 |
| 9th | 152 | 171 | 240 | 197 |
| 11th | 172 | 181 | 225 | 203 |
| 14th | 173 | 172 | 202 | 141 |
| 19th | 160 | 181 | 226 | 181 |

The results tabulated above show that $PO_2$ concentrations remain considerably higher (up to the 11th day with both compositions CP-DHA of our Example 3 and CP-DHA-nicotinamide of Example 4, and even up to the 19th day with CP-DHA of Example 3.

The following Table III shows an even more dramatic difference:

TABLE III

| | VARIATIONS IN 2,3- DIPHOSPHOGLYCERATE CONTENT | | | |
|---|---|---|---|---|
| Number of days | ACD | CPD | CP-DHA | CP-DHA-NICOTINAMIDE |
| 1st | 7.20 | 7.28 | 7.75 | 7.84 |
| 3rd | 7.03 | 7.25 | 8.10 | 7.56 |
| 7th | 4.10 | 5.0 | 6.76 | 7.62 |
| 9th | 4.20 | 4.88 | 8.52 | 8.18 |
| 11th | 4.86 | 4.80 | 7.36 | 7.82 |
| 14th | 2.12 | 3.75 | 6.82 | 6.54 |
| 19th | 0.83 | 2.50 | 5.75 | 5.95 |

The data above in Table III shows that globular 2,3-diphosphoglycerate which at the start of the experiment was 7.2 micromoles per liter of red blood cells drops on the 19th day to as low as 0183 micromoles per liter of red blood cells.

The incredible drop is only slightly effected or halted by solution CPD whereas in the composition of the invention CP-DHA it was kept to a minimum i.e. 5.75 micromoles of per liter of red blood cells on the 19th day compared with 7.75 micromoles per liter of red blood cells on the first day. Similar results were obtained with the composition of Example 4. In this medium the initial concentration was 7.84 micromoles per liter on the first day of the test. On the 19th day the concentration was still 5.95 micromoles per liter of red blood cells.

This maintainence of 2,3-diphosphoglycerate concentration indicates a strong conservation of glycolysis activity when DHA is used in place of glucose in a blood conservation solution. It may be surmised that after phosphorulation dihydroxyacetone which can oxidize $NADH_2$ for reduction into glycerophosphate makes the maintainence of glycolysis possible.

The higher values of $PO_2$ in the blood samples which employ Dihydroxy acetone as a component in the composition show that in these cases the higher concentration of 2,3-diphosphoglycerate makes it possible to maintain stability and prevent for a longer period of time the possibility of breakdown of oxyhemoglobin. We must remember that blood components whose metabolic activity is mainly glycolytic do not consume much oxygen.

Examination and interpretation of these findings as set out in our earlier applications referred to above clearly show that dihydroxyacetone and dihydroxyacetone mixed with nicotinamide form a superior composition for blood conservation over those heretofor recognized. The several appended claims spell out the scope of my invention as explained by the forgoing specification.

The composition of the present invention may be added to blood in equal parts by weight or in greater or lesser amount than the blood. The latitude of use is similar to that of known blood stabilizers and the practical amounts used roughly the same. As a general statement however from 99 parts to 1 part of the composition could be used with one part of blood to stablize it.

It has been found that the reoxidation of the $NADH_2$ coenzyme can be obtained by means of the introduction of dihydroxyacetone compound which is immediately transformed by the organism into dihydroxyacetone phosphate. In fact, the dihydroxyacetone phosphate is transformed in the cell into glycerophosphate, and due to the balance between it and DHA this transformation causes a new molecule of glyceraldehyde-3-phosphate to enter the cycle. Said transformation of the dihydroxyacetone phosphate is effected at the same time as the oxidation of the NADH$_2$ coenzyme to NAD so that the blockage due to the hyperlactacidemia disappears.

I claim:

1. A composition comprising one part of collected red blood cells stabilized with respect to 2,3-diphosphoglycerate content with 1 to 99 parts of a blood-2,3 diphosphoglycerate stabilizing combination consisting essentially of:
   a. An effective amount of dihydroxyacetone sufficient when administered with effective amounts of:
   b. sodium citrate dihydrate,
   c. citric acid monohydrate and
   d. phosphate monosodium monohydrate or mixture thereof to maintain ph and PO$_2$ values and globular 2,3 D.P.G. (diphoshoglycerate) levels for 9 days in vitro and thereby to conserve glycolysis of said R.B.C. (red blood cells, in vitro) for at least 9 days in vitro as compared with 3 days in vitro stability of 2,3 diphosphoglycerate content when red blood cells are stabilized with (b) (c) (d) and glucose, and
   e. an amount of nicotinamide effective to maintain the globular 2,3 diphosphoglycerate content of red blood cells 11 days in vitro.

2. A composition according to claim 1 wherein there is present 2.32 grams of (a), 2.65 grams of (b) 327 milligrams of (c) 222 mg of (d) and 7.44 grams of (e)

3. A method for maintaining the 2.3-diphosphoglycerate content of collected red blood cells which comprises admixing 1 part thereof with 1 to 99 parts of the combination consisting essentially of (a) (b) (c) (d) and (e) in accordance with claim 1 and maintaining said stabilized red blood cells in vitro for 11 days.

* * * * *